Patented June 28, 1938

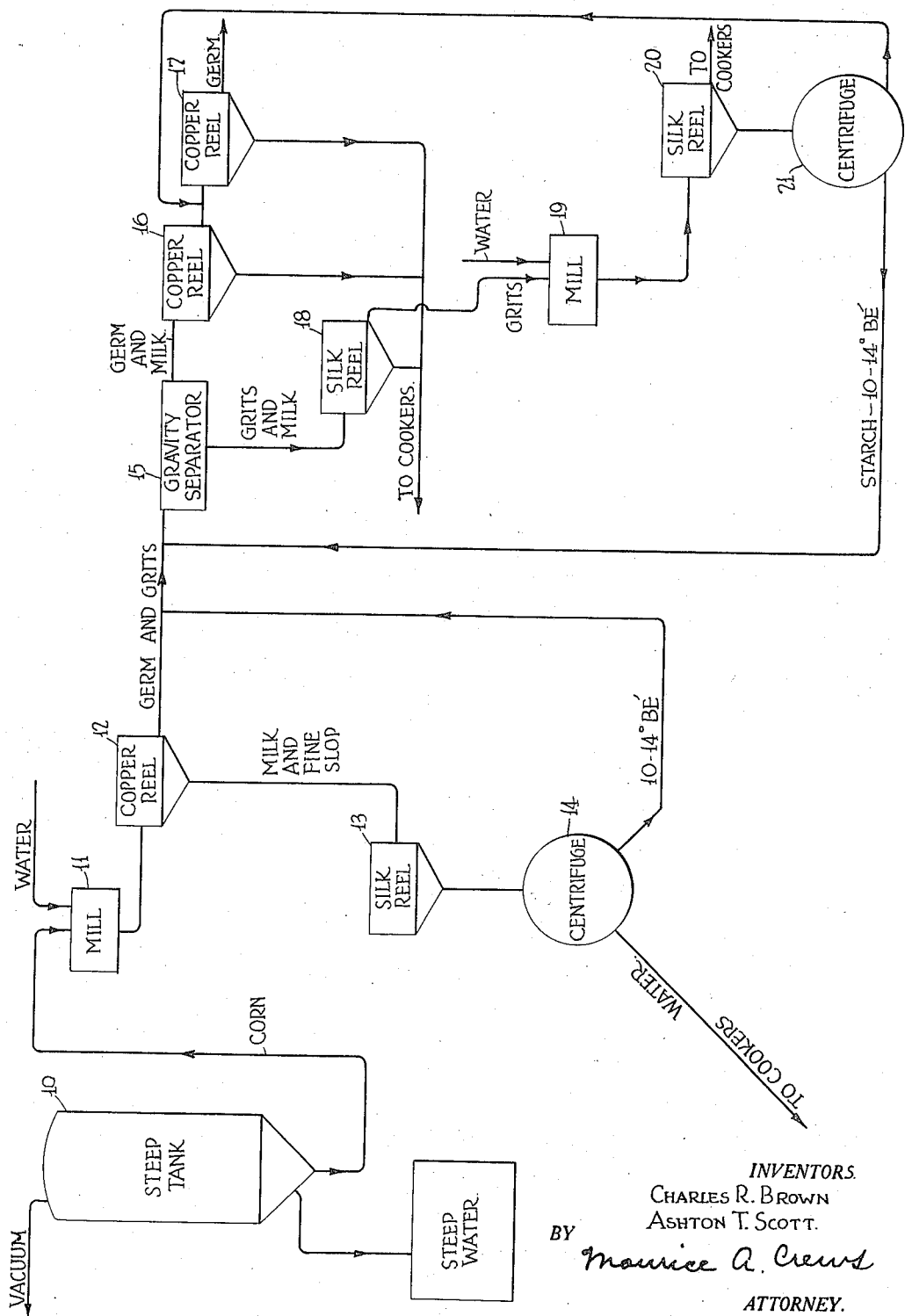

2,122,084

UNITED STATES PATENT OFFICE 2,122,084

STEEPING AND DEGERMINATING PROCESS

Charles R. Brown, Champaign, Ill., and Ashton T. Scott, Ardmore, Pa., assignors to The Sharples Specialty Company, Philadelphia, Pa., a corporation of Delaware Application November 13, 1935, Serial No. 49,494

13 Claims. (Cl. 127—68)

The present invention relates to the steeping of grain and to the degermination thereof. It is particularly concerned with the problem of performing these operations in a manner enabling the user of the process separately to obtain a starch suitable for use in the manufacture of high grade spirits and a germ from which the valuable oil may be economically removed in good yield.

In the manufacture of spirituous liquors from grain, it is important that long contact of moist grain or of starch liquor produced therefrom with the atmosphere be avoided in order to avoid undesired bacterial contamination which would otherwise result in imparting a disagreeable odor or flavor to the spirits produced from the grain.

In connection with prior art processes for preparing starch, such decomposition occurs at two stages of the process, to wit, during the long steeping period which is necessary in connection with such prior art practices in order to produce the desired softening of the grain necessary to the subsequent efficient extraction of starch therefrom and during the practice of removing the germ from the starch by a separating process involving the continuous recycling of a substantial part of the starch-containing liquid.

The object of the present invention has been to develop a process of steeping and degerminating grain and of separating starch from the germ in such a manner as to produce a starch which has not been subjected to these contaminating influences and at the same time efficiently to remove the germ from such starch. In the prior application of Charles R. Brown, Serial No. 15,135, filed April 6, 1935, entitled "Deaeration process", a steeping process is described by which the contamination entailed in prior art steeping processes is largely avoided by shortening the time involved in the practice of the steeping step from a period of days to a period of approximately four hours. This process involves as its essential steps the preliminary removal of air from the grain by subjection of the grain to a vacuum for a sufficient length of time effectively to remove the major portion of the air contained therein while the grain is dry and the subsequent introduction of steeping liquid, e. g., water, to the evacuated grain and the subjection of the grain in the presence of the steeping liquid to a pressure substantially greater than that maintained during the evacuating step and preferably at least as great as atmospheric pressure. By the practice of such a steeping process it has been possible to soften the grain sufficiently to facilitate subsequent extraction of starch by conventional methods within a very short period of time, thus yielding a product substantially free of bacterial contamination.

The practice of a steeping operation of this character would appear to be an excellent first step in the manufacture of spirituous liquors because of such avoidance of contamination, but further and difficult problems are encountered in attempting to extract the germ from the steeped grain so produced in such a manner as to avoid contamination incident to the germ-removing operation. The conventional step of germ removal used in starch manufacture involves continuous recycling of starch containing liquid produced in that operation and it is self-evident that such continuous recycling exposes the material so recycled to the contaminating conditions avoided by the improved vacuum steeping process.

A further problem is encountered in attempting to separate the germ obtained by the vacuum steeping process described above and in the aforementioned prior application by subsidence because of the fact that the germ of grain steeped in the improved process has a much higher specific gravity than does the germ of grain steeped for a number of days in accordance with the prior art. During the steeping step of prior art procedure, a large proportion of the material contained in the germ of the grain is dissolved in the steeping liquid and is accordingly removed with that liquid when the steeping operation has been completed, thereby yielding a germ having a much lower specific gravity than does the germ before subjection to the steeping operation.

In the improved vacuum steeping process, the grain is subjected to the extracting effect of the steeping liquid for such a short period of time that many of the ingredients of the germ which have high specific gravity are not removed from the germ as in prior art procedure and the germ so produced therefore requires different separating conditions from those heretofore employed, i. e., it requires that the liquid from which the germ is separated in the subsidence separating apparatus be of much higher specific gravity than the liquid heretofore used in such connection in the manufacture of starch. Such high specific gravity is necessary to float the germ and thus render its separation possible. The use of such liquid of higher specific gravity entails another difficulty, in that this high specific gravity causes the fine slop heretofore settled in the germ separating operation, and hence passing from the system with the grits, to remain suspended in the starch milk and impede the separation of the germ as the lightest constituent.

The object of the present invention has been to avoid all of these difficulties and to provide a process in which the fine slop can be adequately removed and the germ adequately separated from other constituents. Another object of the invention has been to avoid continued recycling of starch.

The invention will be better understood by reference to the attached flow sheet which constitutes a diagrammatic illustration of the steps of the process and the apparatus utilized in their performance.

The first step in the practice of the present process consists in the performance of a steeping operation similar to that described in the above-identified application of Charles R. Brown, upon the grain to be treated. Since the invention was conceived in connection with research on the treatment of corn, it will be assumed, in the following discussion that we are concerned with the treatment of corn, this method of presentation being chosen solely for the purpose of simplicity of description, since other grains may be treated in accordance with the principles of the invention. The corn to be treated is placed in a tank 10, a sufficient quantity of corn being preferably deposited in this tank to fill it about two-thirds. Vacuum is next applied to the corn within the tank, the corn being preferably maintained in a dry condition until after the vacuum has been applied for a sufficient length of time to remove substantially all of the air contained within the corn.

The evacuation of the corn is completed within a few minutes. Upon its completion, the corn is covered with steeping liquid, the vacuum being maintained during the introduction of such steeping liquid. After the corn has been covered with steeping liquid, the interior of the steeping tank is vented to the atmosphere or otherwise subjected to a pressure at least as great as atmospheric, thus compelling the steeping liquid to enter into the de-aerated grains. It has been found that the grain can be sufficiently softened by this sequence of sub-atmospheric de-aeration and the subsequent steeping under atmospheric or greater pressure in a period varying between three and six hours as contrasted with the steeping period of from three to eight days employed in prior art practice.

At the completion of the steeping operation the steeping liquid is drawn off from the steeped and softened grain and the grain is then passed to a degerminating mill 11. This mill consists of a simple form of cracking apparatus by which the corn is subjected to a coarse cracking operation and is well known in the starch-making art. The cracked corn is mixed with water and contains the germ, grits, starch milk and fine slop. In accordance with methods of manufacturing starch practiced in the prior art, this entire mass of material leaving the degerminating mill is passed directly to a gravity separator, the germ floating in this separator and being removed with a portion of the milk, while the grits and fine slop subside and are separated as the heaviest effluent from the gravity separator. The starch milk constituting the bulk of the material passing through the separator has a specific gravity of approximately 8° Bé. when produced in accordance with prior art procedure. Since the germ separated from the grain at the conclusion of the long steeping period employed in the prior art has a substantially lower specific gravity than this starch milk and the grits and fine slop have a substantially higher specific gravity than the starch milk, the problem of separating these three constituents from each other is not a difficult one.

The material resulting from the vacuum steeping process described above and employed as a first step in the practice of the present invention presents difficulties of separation not encountered in the prior art procedure. The germ resulting from the present steeping operation has a specific gravity so high that a starch milk having a specific gravity between 10 and 14° Bé. is required in order that the germ may float upon the starch milk. A starch milk having this specific gravity must necessarily contain a larger proportion of starch than is contained in the liquid heretofore employed in the gravity separating operation. Such a starch milk has a higher viscosity than the starch milk heretofore used in the separating operation and it also has a specific gravity within the same range as that of the fine slop to be removed. The removal of this fine slop as a heavier effluent at the same time that the germ is removed as a lighter effluent of a subsidence separating operation is therefore not feasible in the treatment of material produced by the steeping and cracking steps of the present process.

In the practice of the present invention milk and fine slop are preliminarily removed from the corn germ and grits by means of a copper reel 12 having perforations of such size as to allow the milk and fine slop to flow therethrough, but to cause the germ and grits to pass longitudinally through the reel. Such reels, as well as the silk reels which operate upon a similar principle and are referred to hereinafter, are well known in this art and will not be described in detail in connection with subsequent references thereto.

The milk and fine slop separated from the germ and grits in the separator 12 are next passed to a silk reel 13 which is so fine as to exclude passage of the fine slop through the silk, but allows passage of the starch milk therethrough and consequent separation of this milk from the fine slop. The fine slop so separated is passed to the cookers. The starch milk which passes through the silk is next concentrated in order to produce a concentrated suspension having the desired specific gravity of 10 to 14° Bé. required of the liquid to be used in the separation of the germ from grits and milk. This concentration is preferably accomplished in a centrifugal separator 14, water or dilute starch milk being obtained as one effluent of the centrifugal separation and starch milk of the desired specific gravity being obtained as the second effluent.

The germ and grits separated from milk and fine slop in the reel 12 are passed, together with the concentrated effluent of the centrifuge 14 to a subsidence separating apparatus, which may be, for example, a gravity or centrifugal separator. Since the grits have a higher specific gravity than the starch milk passed to the separator 15 and the germ has a lower specific gravity than this starch milk, the germ and grits will be separated from each other in this separator, each of these solid effluents carrying with it a portion of the starch milk.

It will be evident from the above discussion that the problems presented in connection with the separation of the slop from the germ because of the fineness of this slop, the viscosity of the liquid used in the separation and the specific gravity of this liquid have been avoided by the removal of this fine slop before the mixture under treatment reaches the subsidence separating stage. It will also be evident that the problem of economically obtaining a liquid having the desired specific gravity for use in the subsidence separating operation has been solved in connection with this removal of fine slop by the subsequent concentration of the starch milk removed with the slop and its passage with the germ and grits to the subsidence separating stage.

The germ and starch milk separated as the lighter effluents from the subsidence separator 15 are next passed to a copper reel 16 in which the milk is separated from the germ. The germ removed from the separator 16 is preferably washed with water or very dilute starch milk and is next passed through a copper reel 17 in which the wash liquid, together with starch removed from the germ by the washing operation is separated from the germ. After this final washing and separating operation the germ may be subjected to conventional pressing operations for the removal of its valuable oil.

In the performance of operations of the character discussed above, it is desirable that a larger quantity of starch milk be passed through the subsidence separator 15 than is obtained by the steps discussed above. This result is attained in conventional starch manufacturing processes by recycling to this separator a part of the starch milk passing therefrom. Such procedure is feasible when the starch is to be used for many purposes, but it constitutes an undesirable step in the manufacture of starch for distillery purposes. It is self-evident that if starch milk is recycled in this manner at least a part of that milk will be recycled indefinitely. Such continued recycling naturally results in bacterial contamination and such bacterial contamination is inconsistent with the manufacture of whiskey having the desired flavor and odor.

A feature of the present invention consists in the economical passage of additional liquid of the desired specific gravity to the subsidence separator 15 and the development of a system assuring that starch milk passed to this separator will not be continuously recycled.

The grits and milk passing from the separator 15 are passed through a silk reel 18 to effect separation of the milk from the grits, the milk being passed to cookers together with the aqueous phases removed from the separators 16 and 17. The grits, which pass longitudinally through the separator 18, are next passed through mill 19 designed to grind them into a very fine state, water being passed to this mill to assist in the grinding operation and dilute the ground material. The effluent from the mill 19 is next passed to a silk reel 20 which separates starch milk produced as the result of the grinding operation from material which may not be ground quite so finely.

The starch milk passing through the silk reel 20 is next concentrated by passage to a centrifugal separator 21. This centrifugal separator discharges a dilute effluent which may be employed in washing the germ passing from separator 16 to separator 17 as illustrated, and it produces a concentrated effluent which consists of a starch milk having a specific gravity between 10 and 14° Bé. This concentrated effluent is returned to the subsidence separator 15 and serves to make up the additional liquid required in this separator to effect the desired separation between germ and grits passing from the seperator 12.

In order adequately to understand the significance of the steps just discussed, it is important to note that the mill 19 is designed and operated in such a manner as to grind the grits which it receives into a very fine state and that the silk reel separator 20 effects separation from the starch milk which it discharges of all grits, particles and fine slop which may not be sufficiently finely ground to pass as starch milk through the silk reel 18 and the copper reel 16. Bearing these facts in mind, it will be evident that all grain particles passing through the system in the form of germs pass directly through the separators 12, 15, 16 and 17, that all grain particles passing through in such finely divided form as to constitute the suspended portion of what is ordinarily known as starch milk follow alternative courses which may carry them through separators 12, 13, 14, 15 and 16, through separators 12, 13, and 14 to the cookers, through separators 12, 13, 14, 15 and 18, or, in a case of particles which adhere to the germ, through separators 12, 15, 16 and 17 to the cookers.

In the case of grain particles passing to the separating system in the form of grits, these particles will be passed through separators 12, 15 and 18 to the mill 19. In this mill they will be ground and the ground particles which are sufficiently fine to pass through a silk reel will be recycled together with the water in which they are suspended. Thus, the grain constituting such particles will be passed through the gravity separator twice, but it is important to note that such grain can pass through no part of the system more than twice, for as explained above, this grain, before recycling, is reduced to a form so fine that it will pass through separators 16 and 18 as starch milk and be separated from the grits and germs passing through the system. It will thus be seen that no part of the liquid or solid matter passing from the mill 11 to the system is continuously recycled and that the only part of the material so passed which is recycled even once is the solid constituent of the starch milk resulting from the very fine grinding of the grits in mill 19.

Reference has been made above to specific pieces of separating apparatus, such as the copper and silk reels 12, 13, 16, 17, 18 and 20 and the centrifuges 14 and 21, but it is to be understood that the invention includes broadly equivalent elements for performing the separating operations described in connection with this apparatus and that any apparatus adapted to effect the desired separating and concentrating operations may be used within the broad spirit of the invention.

We do not therefore wish to be limited except by the scope of the sub-joined claims.

We claim:

1. The method of degerminating grain which comprises cracking said grain, separating the germ and starch milk from cracked grits by subsidence, separating grits from the starch milk passing from said subsidence separating operation and passing the separated starch milk from the separating system, thereafter disintegrating said separated grits to liberate their starch constituents and suspending said starch constituents in a liquid and returning said suspension to the subsidence separating operation.

2. The method of degerminating grain which comprises removing air entrained in said grain by the application of a vacuum thereto, steeping the evacuated grain, cracking said steeped grain and mixing it with liquid, removing starch milk and fine slop resulting from the cracking operation from the mixture so produced, separating fine slop from the mixture of starch milk and fine slop so removed, concentrating the starch milk separated from said fine slop to produce a fluid of higher specific gravity than the removed starch milk, and thereafter separating the germ from remaining constituents of the grain by subsidence in the presence of said concentrated starch milk and in the absence of said fine slop.

3. The method of degerminating grain which comprises subjecting said grain to a vacuum and thereafter steeping said grain, cracking said steeped grain and mixing it with liquid, removing starch milk and fine slop resulting from the cracking operation from the mixture so produced, separating said fine slop from said starch milk, centrifugally concentrating the starch milk so separated to produce a starch milk of higher specific gravity than the germ and passing the concentrated starch milk together with the constituents of the mixture from which the milk and fine slop were removed to a separating operation and separating the germ from remaining constituents of the grain by subsidence in the presence of said concentrated starch milk and in the absence of said fine slop.

4. The method of degerminating grain which comprises cracking said grain and mixing it with liquid, removing starch milk and fine slop resulting from the cracking operation from the mixture so produced, thereafter separating the germ from grits and milk by subsidence in the presence of a liquid medium and in the absence of said fine slop, separating the grits from the milk so separated, grinding the separated grits with water to produce starch milk, and passing such starch milk to the separating operation in which the germ is separated from the grits and milk.

5. The method of degerminating grain which comprises cracking said grain and mixing it with aqueous liquid, removing starch milk and fine slop resulting from the cracking operation from the mixture so produced, thereafter separating the germ from the remaining constituents of the grain by subsidence in the presence of a liquid medium and in the absence of said fine slop, thereafter separating grits from starch milk with which said grits pass from the subsidence separating operation and grinding said grits to a fine form in the presence of water, separating less finely ground material from the starch milk produced as the result of said grinding operation, and passing the starch milk from which said less finely ground material has been removed to the subsidence separating operation.

6. The method of degerminating grain which comprises cracking said grain and mixing it with aqueous liquid, removing starch milk and fine slop resulting from the cracking operation from the mixture so produced, thereafter separating the germ from the remaining constituents of the grain by subsidence in the presence of a liquid medium and in the absence of said fine slop, thereafter separating grits from starch milk with which said grits pass from the subsidence separating operation and grinding said grits to a fine form in the presence of water, separating less finely ground material from the starch milk produced as the result of said grinding operation, centrifugally concentrating the starch milk from which said less finely ground material has been removed, passing the concentrated effluent from said centrifugal concentrating operation to the subsidence separating operation and washing the separated germ with the dilute effluent from said centrifugal concentrating operation.

7. The method of degerminating grain which comprises cracking said grain and mixing it with liquid, removing starch milk and fine slop resulting from the cracking operation from the mixture so produced, separating said fine slop from said starch milk, centrifugally concentrating the starch milk so separated to produce a starch milk of higher specific gravity than the germ and passing the concentrated starch milk together with the constituents of the mixture from which the milk and fine slop were removed to a separating operation and separating the germ from remaining constituents of the grain by subsidence in the presence of said concentrated starch milk and in the absence of said fine slop.

8. The method of degerminating grain which comprises cracking said grain and mixing it with aqueous liquid, removing starch milk and fine slop resulting from the cracking operation from the mixture so produced, separating said fine slop from said starch milk, centrifugally concentrating the starch milk so separated and passing the concentrated starch milk together with the constituents of the mixture from which the milk and fine slop were removed to a separating operation, separating the germ from remaining constituents of the grain by subsidence in the presence of said concentrated starch milk and in the absence of said fine slop, separating grits from milk separated from the germ in the subsidence separating operation, grinding the separated grits with water to produce starch milk, and passing such starch milk to the separating operation in which the germ is separated from the grits and milk.

9. The method of degerminating grain which comprises cracking said grain, separating the germ and starch milk from cracked grits and starch milk by subsidence, separating the cracked grits from the starch milk with which it is separated from the germ and starch milk, disintegrating said grits to liberate their starch constituents and suspending said starch constituents in a liquid and returning said suspension to the subsidence separating operation.

10. The method of degerminating grain which comprises cracking said grain, separating the germ and starch milk from cracked grits and starch milk by subsidence, separating the germ from starch milk separated from the grits and starch milk therewith, separating the grits from the starch milk separated from the germ and starch milk therewith, grinding with water the grits so separated from starch milk to produce a further quantity of starch milk and returning said last mentioned starch milk to the subsidence separating operation.

11. The method of degerminating grain which comprises cracking said grain, separating the germ and starch milk from cracked grits and starch milk by subsidence, separating the germ from starch milk separated from the grits and starch milk therewith, separating the grits from the starch milk separated from the germ and starch milk therewith, grinding with water the grits so separated from starch milk to produce a further quantity of starch milk, separating less finely ground grain constituents from said last mentioned starch milk and thereafter returning said last mentioned starch milk to the subsidence separating operation.

12. The method of degerminating grain which comprises cracking said grain, separating the germ and starch milk from cracked grits and starch milk by subsidence, separating the germ from starch milk separated from the grits and starch milk therewith, separating the grits from the starch milk separated from the germ and starch milk therewith, grinding with water the grits so separated from starch milk to produce a further quantity of starch milk, separating less finely ground grain constituents from said last mentioned starch milk, passing the starch milk from said last mentioned separating operation through a centrifugal separator to effect concentration thereof and thereafter returning the concentrated starch milk so produced to the subsidence separating operation.

13. The method of degerminating grain which comprises cracking said grain, separating the germ and starch milk from cracked grits and starch milk by subsidence, separating the germ from starch milk separated from the grits and starch milk therewith, separating the grits from the starch milk separated from the germ and starch milk therewith, grinding with water the grits so separated from starch milk to produce a further quantity of starch milk, separating less finely ground grain constituents from said last mentioned starch milk, passing the starch milk from said last mentioned separating operation through a centrifugal separator to effect concentration thereof, thereafter returning the concentrated starch milk so produced to the subsidence separating operation and washing the germ separated from remaining constituents of the grain with the more dilute effluent from said centrifugal concentrating operation.

CHAS. R. BROWN.
ASHTON T. SCOTT.